(12) United States Patent
Deng et al.

(10) Patent No.: US 9,183,453 B2
(45) Date of Patent: Nov. 10, 2015

(54) BANDING NOISE DETECTOR FOR DIGITAL IMAGES

(71) Applicant: STMicroelectronics Asia Pacific Pte. Ltd., Singapore (SG)

(72) Inventors: Xiaoyun Deng, Guangzhou (CN); Lucas Hui, Singapore (SG)

(73) Assignee: STMICROELECTRONICS ASIA PACIFIC PTE. LTD., Singapore (SG)

( * ) Notice: Subject to any disclaimer, the term of this patent is extended or adjusted under 35 U.S.C. 154(b) by 53 days.

(21) Appl. No.: 14/069,181

(22) Filed: Oct. 31, 2013

(65) Prior Publication Data

US 2015/0117782 A1 Apr. 30, 2015

(51) Int. Cl.
*G06K 9/40* (2006.01)
*G06T 5/00* (2006.01)

(52) U.S. Cl.
CPC . *G06K 9/40* (2013.01); *G06T 5/002* (2013.01); *G06T 2207/10024* (2013.01); *G06T 2207/20012* (2013.01)

(58) Field of Classification Search
CPC . G06T 5/002; G06T 5/20; G06T 2207/10016; G06T 2207/10024; G06T 2207/20012; G06T 2207/20021; G06T 2207/20192; H04N 19/86; H04N 5/142; H04N 5/21; G06K 9/40
USPC ......... 382/194, 275, 305, 232, 294, 132, 199, 382/260, 261, 262, 263, 264; 375/240.29
See application file for complete search history.

(56) References Cited

U.S. PATENT DOCUMENTS

| | | | | |
|---|---|---|---|---|
| 5,699,079 A | * | 12/1997 | Gossett | 345/605 |
| 6,704,437 B1 | * | 3/2004 | He et al. | 382/128 |
| 7,386,158 B2 | * | 6/2008 | Yamada | G06T 5/004 |
| | | | | 382/132 |
| 7,912,316 B2 | * | 3/2011 | Sasada | 382/275 |
| 8,471,962 B2 | | 6/2013 | Deng et al. | |
| 8,731,323 B2 | * | 5/2014 | Wang | H04N 19/86 |
| | | | | 382/190 |
| 2002/0071600 A1 | * | 6/2002 | Yamada | 382/132 |
| 2004/0258325 A1 | * | 12/2004 | Sasada | G06T 5/004 |
| | | | | 382/275 |
| 2005/0249417 A1 | * | 11/2005 | Song et al. | 382/199 |
| 2006/0056724 A1 | * | 3/2006 | Le Dinh | G06K 9/40 |
| | | | | 382/274 |
| 2008/0123979 A1 | | 5/2008 | Schoner | |
| 2010/0066912 A1 | | 3/2010 | Kumwilaisak et al. | |
| 2011/0129020 A1 | * | 6/2011 | Li | G06T 7/0002 |
| | | | | 375/240.29 |
| 2013/0128122 A1 | * | 5/2013 | Wang | H04N 19/86 |
| | | | | 348/607 |
| 2015/0117793 A1 | * | 4/2015 | Deng | G06T 5/20 |
| | | | | 382/261 |

* cited by examiner

*Primary Examiner* — Mekonen Bekele

(74) *Attorney, Agent, or Firm* — Allen, Dyer, Doppelt, Milbrath & Gilchrist, P.A. Attorneys at Law

(57) ABSTRACT

A method and apparatus are provided for detecting banding noise in a digital signal representative of an image. The method includes determining, by a banding noise detector, a count of increment steps in pixel values and a count of decrement steps in pixel values along a filter direction in a neighborhood of a current pixel of the image, checking, by the banding noise detector, if the count of increment steps or the count of decrement steps in the neighborhood of a current pixel exceeds a step threshold value, and classifying, by the banding noise detector, the current pixel as being located in the banding noise zone if the count of increment steps or the count of decrement steps does not exceed the step threshold value.

33 Claims, 7 Drawing Sheets

BANDING NOISE DETECTOR FOR DIGITAL IMAGES

BACKGROUND

1. Technical Field

This disclosure relates to digital video processing methods and apparatus. In particular, the disclosure relates to image quality improvement by removal of banding artifacts, also known as banding noise. More particularly, the disclosure relates to detection of banding noise.

2. Discussion of the Related Art

Banding artifacts, or banding noise, in a digital image or a video sequence can be caused by quantization of gray scale values or color values and may appear as a false contour effect in a smooth region of the image. False contours may appear as bands in a uniform or continuously varying area of the image.

Techniques have been proposed for removing banding artifacts from digital images. In one approach, a method for detecting digital contours utilizes a selected one of a plurality of search window sizes based on a corresponding variance of the image, and removes the digital contour by using a low pass filter matched to the selected search window size. Another approach utilizes a block based texture/flat area classification by analyzing the coded block maximum/minimum edge value and utilizing a debanding filter with adaptive window size based on the texture/flat classification results.

Conventional debanding techniques have various drawbacks, including but not limited to undesired side effects on image quality and high implementation cost. Implementation costs include integrated circuit chip area and processing time. Accordingly, there is a need for improved methods and apparatus for banding noise detection in digital image signals.

SUMMARY

According to one embodiment, a method is provided for detecting banding noise in a digital signal representative of an image. The method comprises determining, by a banding noise detector, a count of increment steps in pixel values and a count of decrement steps in pixel values along a filter direction in a neighborhood of a current pixel of the image, checking, by the banding noise detector, if the count of increment steps or the count of decrement steps in the neighborhood of a current pixel exceeds a step threshold value, and classifying, by the banding noise detector, the current pixel as being located in the banding noise zone if the count of increment steps or the count of decrement steps does not exceed the step threshold value.

In embodiments, the method further comprises checking, by the banding noise detector, if a ratio of a minimum count of increment steps or decrement steps to a maximum count of increment steps or decrement steps exceeds a ratio threshold value; and classifying, by the banding noise detector, the current pixel as being located in a banding noise zone if the ratio does not exceed the ratio threshold value.

In embodiments, the method further comprises classifying, by the banding noise detector, the current pixel as being located in an image texture zone if both the count of increment steps and the count of decrement steps exceeds the step threshold value, and if the ratio of the minimum count of increment steps or decrement steps to the maximum count of increment steps or decrement steps exceeds the ratio threshold value.

In embodiments, the method further comprises checking, by the banding noise detector, if a maximum edge value of the pixels in the neighborhood of the current pixel exceeds an edge threshold value; classifying, by the banding noise detector, the current pixel as being located in the banding noise zone if the maximum edge value does not exceed the edge threshold value, and if the count of increment steps or the count of decrement steps does not exceed the step threshold value; and classifying, by the banding noise detector, the current pixel as being located in the banding noise zone if the maximum edge value does not exceed the edge threshold value, and if the ratio of the minimum count of increment steps or decrement steps to the maximum count of increment steps or decrement steps does not exceed the ratio threshold value.

In embodiments, the method further comprises classifying, by the banding noise detector, the current pixel as being located in an image texture zone if the maximum edge value of the pixels in the neighborhood of the current pixel exceeds the edge threshold value.

In embodiments, the method further comprises controlling a filter strength of a banding noise filter near a boundary between the banding noise zone and a texture zone to produce a desired transition of filter strength between the banding noise zone and the texture zone.

In embodiments, the method further comprises controlling a filter strength of a banding noise filter near a boundary between the banding noise zone and a texture zone based on a distance between the current pixel and a nearest pixel in the texture zone.

In embodiments, the method further comprises performing the determining, the checking and the classifying in vertical and/or horizontal directions of the image.

In embodiments, the count of increment steps and the count of decrement steps is determined as follows:

$$Cp = \sum_{(x,y) \in N} [(I(x, y) > I(x-1, y))?1:0]$$

$$Cn = \sum_{(x,y) \in N} [(I(x, y) < I(x-1, y))?1:0]$$

where Cp represents the count of increment steps in the filter direction, Cn represents the count of decrement steps in the filter direction, and I(x,y) represents the pixel value at the coordinates (x,y) in the image.

In embodiments, the count of increment steps and the count of decrement steps is determined as follows:

$$Cp = \sum_{j \in [-(H-1),0]} \left[ \left( \sum_{i \in [0, W-1]} \left[ \left( I\left(\left\lfloor \frac{x}{W} \right\rfloor \times W + i, y + j\right) > \right. \right. \right. \right.$$
$$\left. \left. \left. I\left(\left\lfloor \frac{x}{W} \right\rfloor \times W + i, y + j - 1\right)\right)?1:0\right] \right) > 0?1:0 \right]$$

$$Cn = \sum_{j \in [-(H-1),0]} \left[ \left( \sum_{i \in [0, W-1]} \left[ \left( I\left(\left\lfloor \frac{x}{W} \right\rfloor \times W + i, y + j\right) < \right. \right. \right. \right.$$
$$\left. \left. \left. I\left(\left\lfloor \frac{x}{W} \right\rfloor \times W + i, y + j - 1\right)\right)?1:0\right] \right) > 0?1:0 \right]$$

where Cp represents the count of increment steps in the filter direction, Cn represents the count of decrement steps in the filter direction, I represents the pixel value, W represents the width of the neighborhood in pixels, and H represents the height of the neighborhood in pixels.

According to another embodiment, apparatus is provided for detecting banding noise in a signal representative of an image. The apparatus comprises an increment and decrement steps counter configured to determine a count of increment steps in pixel values and a count of decrement steps in pixel values along a filter direction in a neighborhood of a current pixel of the image; and a banding noise/texture pixel classifier configured to check if the count of increment steps or the count of decrement steps in the neighborhood of the current pixel exceeds a step threshold value and to classify the current pixel as being located in a banding noise zone if the count of increment steps or the count of decrement steps does not exceed the step threshold value.

According to another embodiment, apparatus is provided for filtering banding noise in a signal representative of an image. The apparatus comprises a banding noise detector including an increment and decrement steps counter configured to determine a count of increment steps in pixel values and a count of decrement steps in pixel values along filter direction in a neighborhood of a current pixel of the image and a banding noise/texture pixel classifier configured to check if the count of increment steps or the count of decrement steps in the neighborhood of the current pixel exceeds a step threshold value and to classify the current pixel as being located in a banding noise zone if the count of increment steps or the count of decrement steps does not exceed the step threshold value, and a de-banding filter strength control unit configured to control filter strength based on the result of classifying the current pixel; and a banding noise filter configured to filter the current pixel in accordance with the filter strength determined by the de-banding filter strength control unit.

According to another embodiment, a method is provided for filtering banding noise in a signal representative of an image. The method comprises determining, by an increment and decrement steps counter, a count of increment steps in pixel values and a count of decrement steps in pixel values along a filter direction in a neighborhood of a current pixel of the image; classifying, by a banding noise/texture pixel classifier, the current pixel as being located in a banding noise zone if the count of increment steps or the count of decrement steps does not exceed a step threshold value; controlling, by a de-banding filter strength control unit, filter strength based on a result of classifying the current pixel; and filtering, by a banding noise filter, the current pixel based on the controlled filter strength.

BRIEF DESCRIPTION OF DRAWINGS

For a better understanding of the embodiments, reference is made to the accompanying drawings, which are incorporated herein by reference and in which.

DETAILED DESCRIPTION

Figure 1:
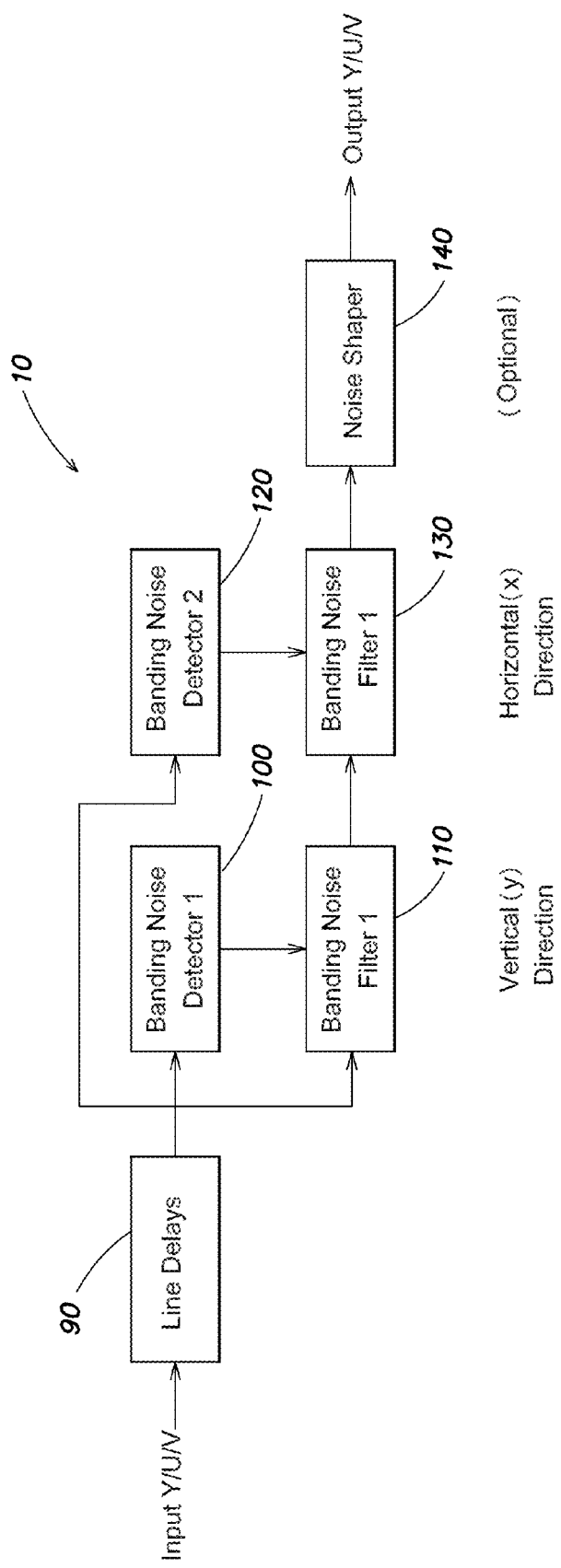
FIG. 1 is a schematic block diagram of apparatus for filtering banding noise in a digital image signal, in accordance with embodiments.

A schematic block diagram of debanding apparatus for filtering banding noise in a digital image signal in accordance with embodiments is shown in FIG. 1. A debanding apparatus 10 receives a digital image input signal and provides a filtered output signal. The debanding apparatus 10 may be part of a set-top box or a digital television, but is not limited to these applications. The debanding apparatus 10 may be implemented, for example, in a "system-on-chip" (SOC) integrated circuit or as an application-specific integrated circuit (ASIC). In further embodiments, the debanding apparatus may be implemented as a processing device and a computer-readable storage device encoded with instructions that, when executed by the processing device, perform debanding as described herein.

Referring again to FIG. 1, a digital image input signal is provided through a line delay 90 to a vertical banding noise detector 100, a vertical banding noise filter 110 and a horizontal banding noise detector 120. The line delay 90 delays the input signal by a known amount of time, such that previous lines of the image are available for processing the current line of the image. The line delay 90 may be omitted in some embodiments. The vertical banding noise detector 100 provides banding noise information to vertical banding noise filter 110, and horizontal banding noise detector 120 provides banding noise information to a horizontal banding noise filter 130. The vertical banding noise filter 110 provides filtered pixel data to horizontal banding noise 130 for further processing. The horizontal banding noise filter 130 provides filtered pixel data to an optional noise shaper 140. Noise shaper 140 provides filtered output pixel data. An example of a suitable noise shaper is disclosed in U.S. 2013/0128122, which is hereby incorporated by reference. The digital image signal is filtered separately in vertical and horizontal directions.

Figure 2:
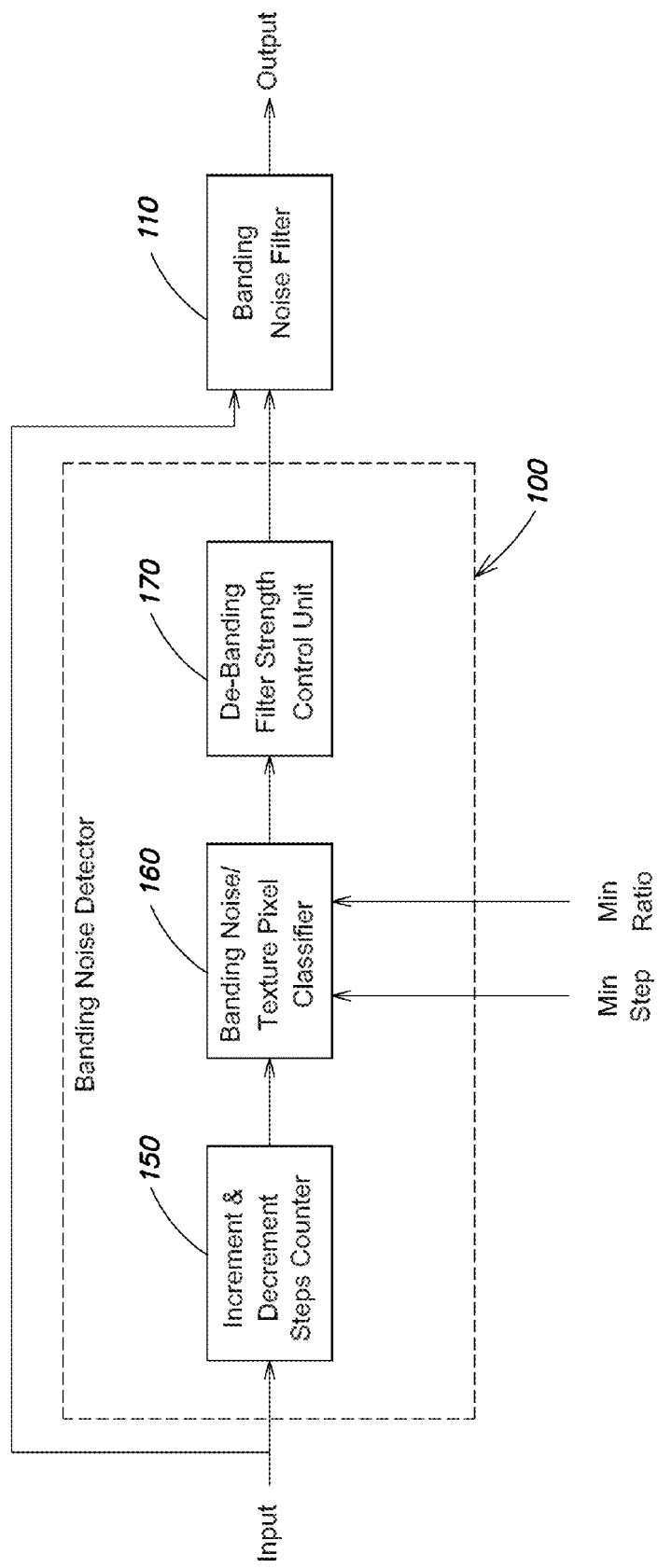
FIG. 2 is a block diagram of a banding noise detector as shown in FIG. 1, in accordance with embodiments.

A block diagram of the banding noise detector 100 of FIG. 1 in accordance with embodiments is shown in FIG. 2. A digital image input signal is provided to banding noise detector 100 and to banding noise filter 110. The banding noise detector 120 and the banding noise filter 130 of FIG. 2 may have a similar configuration. As shown, banding noise detector 100 includes an increment and decrement steps counter 150, a banding noise/texture pixel classifier 160 and a debanding filter strength control unit 170. The increment and decrement steps counter 150 receives the digital image input signal and provides a count of increment steps and a count of decrement steps in a neighborhood of a current pixel as described below. The banding noise/texture pixel classifier 160 receives the count of increment steps, the count of decrement steps, a minimum step threshold and a minimum ratio threshold and provides a classification of the current pixel as being in a banding noise zone or in a texture zone as described below. The debanding filter strength control unit 170 controls the filter strength of banding noise filter 110 based on the classification of the current pixel as being in a banding noise zone or in a texture zone. In some embodiments, control unit 170 provides a first filter strength in a banding noise zone and a second filter strength in a texture zone. In other embodiments, control unit 170 performs boundary control as described below.

Figure 3:
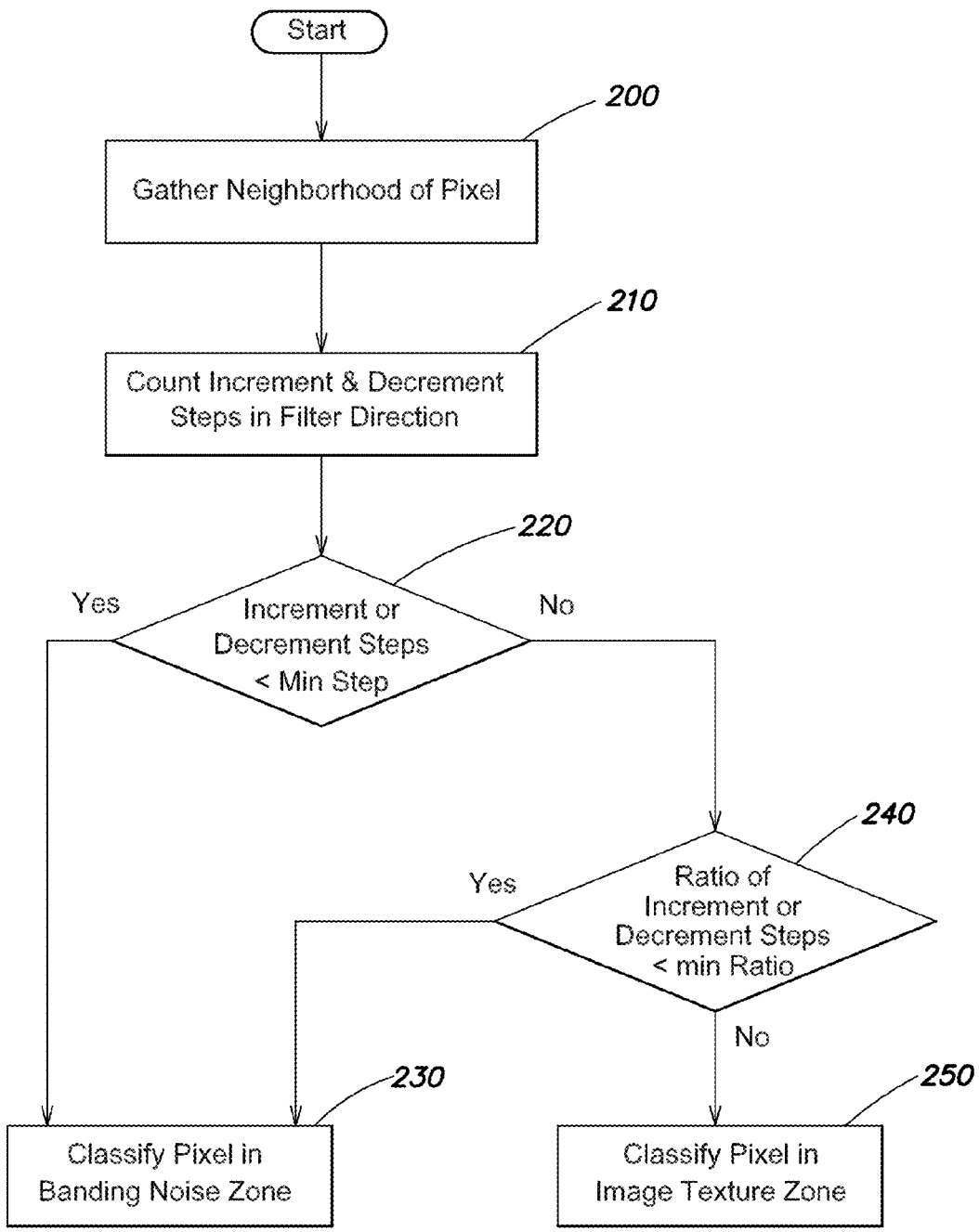
FIG. 3 is a flow chart of a process performed by the banding noise detector of FIG. 2, in accordance with embodiments.

A flow chart of a process performed by the banding noise detector 100 of FIG. 2 in accordance with embodiments is shown in FIG. 3. Banding noise detectors 100, 120 may perform banding noise detection by processing each pixel of the image to provide an output which classifies the pixel as being in a banding noise zone or in a texture, or non-banding, zone. The vertical banding noise detector 100 proceeds in a vertical direction of the image, by processing each column of pixels in succession vertically. The horizontal banding noise detector 100 proceeds in a horizontal direction of the image, by processing each row of pixels in succession horizontally.

Referring again to FIG. 3, the banding noise detector gathers pixel data in the neighborhood of a current pixel being processed in act 200. The neighborhood N of the current pixel may have dimensions of N pixels for horizontal processing or may have dimensions of W×H pixels for vertical processing, where H is the height of the neighborhood in pixels and W is the width of the neighborhood in pixels. The dimensions of the neighborhood N may be selected based on the image resolution or may be defined by the user. One example of neighborhood N is 16×1 pixels.

In act 210, the number of increment steps in pixel values is counted, and the number of decrement steps in pixel values is counted along the filter direction in the neighborhood of the current pixel. The count of increment steps and the count of decrement steps in the horizontal (x) direction may be determined as follows:

$$Cp = \sum_{(x,y) \in N} [(I(x, y) > I(x-1, y)) ? 1 : 0] \quad (1)$$

$$Cn = \sum_{(x,y) \in N} [(I(x, y) < I(x-1, y)) ? 1 : 0] \quad (2)$$

where Cp represents the count of increment steps in the filter direction, Cn represents the count of decrement steps in the filter direction, and I(x,y) represents the pixel value at coordinates (x,y) in the image.

Equations (1) and (2) illustrate an example of counting increment and decrement steps in the horizontal direction over a neighborhood of pixels, assuming the filtering direction is horizontal. Cp represents the count of increment steps in the neighborhood N, which increments by one when the value of the current pixel is greater than that of the previous pixel in the filter direction. Similarly, Cn represents the count of decrement steps in the neighborhood N, which increments by one when the value of the current pixel is lower than that of the previous pixel in the filter direction. Another set of equations for counting increment and decrement steps in the vertical direction for vertical filtering can be easily derived in a similar way.

In further embodiments, the count of increment steps and the count of decrement steps in the vertical (y) direction may be determined as follows:

$$Cp = \sum_{j \in [-(H-1), 0]} \left[ \left( \sum_{i \in [0, W-1]} \left[ \left( I\left(\left\lfloor \frac{x}{W} \right\rfloor \times W + i, y + j\right) > I\left(\left\lfloor \frac{x}{W} \right\rfloor \times W + i, y + j - 1\right) \right) ? 1 : 0 \right] \right) > 0 ? 1 : 0 \right] \quad (3)$$

$$Cn = \sum_{j \in [-(H-1), 0]} \left[ \left( \sum_{i \in [0, W-1]} \left[ \left( I\left(\left\lfloor \frac{x}{W} \right\rfloor \times W + i, y + j\right) < I\left(\left\lfloor \frac{x}{W} \right\rfloor \times W + i, y + j - 1\right) \right) ? 1 : 0 \right] \right) > 0 ? 1 : 0 \right] \quad (4)$$

where W is the width of the neighborhood in pixels and H is the height of the neighborhood in pixels. The value of W is greater than 1 for implementation cost reduction.

Equations (3) and (4) illustrate another example of counting increment and decrement steps in the vertical direction over a neighborhood window of W×H pixels around a current pixel, assuming the filtering direction is now vertical. Slightly different from Equations (1) and (2), the count of increment steps Cp increments by one when at least one pixel out of W horizontally adjacent pixels has a greater pixel value than its previous pixel in the vertical direction. Cn is calculated in a similar way as Cp. By using Equations (3) and (4), only a pair of Cp and Cn counts would need to be calculated and stored for W horizontally adjacent pixels. Hence, the cost of calculation is reduced and the required storage can be reduced to 1/W of the image size.

In act 220, a determination is made as to whether the count of increment steps is less than a minimum step threshold or whether the count of decrement steps is less than the minimum step threshold. If the count of increment steps or the count of decrement steps is less than the minimum step threshold, as determined in act 220, the current pixel is classified as being in a banding noise zone in act 230. If the count of increment steps and the count of decrement steps are greater than the minimum step threshold, as determined in act 220, the process proceeds to act 240.

In act 240, a ratio of a minimum of the count of increment steps and the count of decrement steps to a maximum of the count of increment steps and the count of decrement steps is compared with a minimum ratio threshold. If the ratio is less than the minimum ratio threshold, as determined in act 240, the current pixel is classified as being in a banding noise zone in act 230. If the ratio is greater than the minimum ratio threshold, as determined in act 240, the current pixel is classified as being in an image texture zone in act 250.

The ratio of increment or decrement steps is defined in Equation (5). And the classification of a pixel into banding or texture class is defined in Equation (6).

$$\text{ratio} = \frac{\min(Cp, Cn)}{\max(Cp, Cn)} \quad (5)$$

$$\text{Pixel}(x, y) \in \begin{cases} \text{Banding Zone} & [Cp < MinStep] \text{ or } [Cn < MinStep] \text{ or} \\ & \left[\frac{\min(Cp, Cn)}{\max(Cp, Cn)} < MinRatio\right] \\ \text{Texture Zone} & \text{otherwise} \end{cases} \quad (6)$$

where Pixel(x,y) is the current pixel at coordinates (x,y), MinStep is the minimum step threshold and MinRatio is the minimum ratio threshold.

Figure 4:
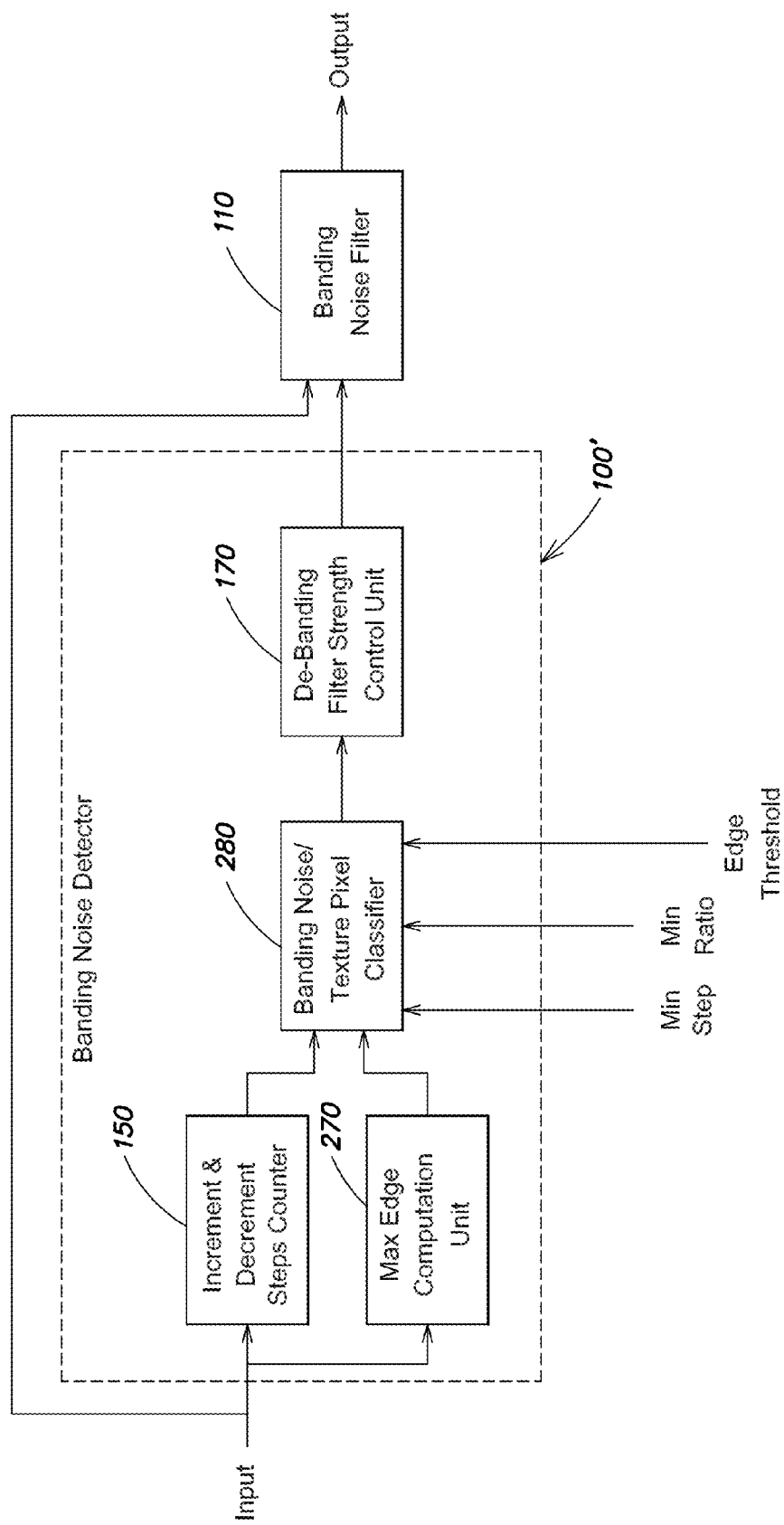
FIG. 4 is a block diagram of a banding noise detector as shown in FIG. 1, in accordance with further embodiments.

A block diagram of a banding noise detector 100' in accordance with further embodiments is shown in FIG. 4. Like elements in FIGS. 2 and 4 have the same reference numerals. A digital image input signal is provided to banding noise detector 100' and to banding noise filter 110. The banding noise detector 100' includes increment and decrement steps counter 150, a max edge computation unit 270, a banding noise/texture pixel classifier 280 and debanding filter strength control unit 170. The increment and decrement steps counter 150 provides a count of increment steps and a count of decrement steps in the neighborhood of a current pixel, and the max edge computation unit provides a max edge calculation in the neighborhood of the current pixel. The banding noise/texture pixel classifier 280 receives the count of increment steps, the count of decrement steps and the max edge value, as well as a minimum step threshold, a minimum ratio threshold and an edge threshold, to perform classification of the current pixel as being in a banding noise zone or in a texture zone. The debanding filter strength control unit 170 controls the filter strength of banding noise filter 110 based on the classification information from banding noise/texture pixel classifier 280.

Figure 5:
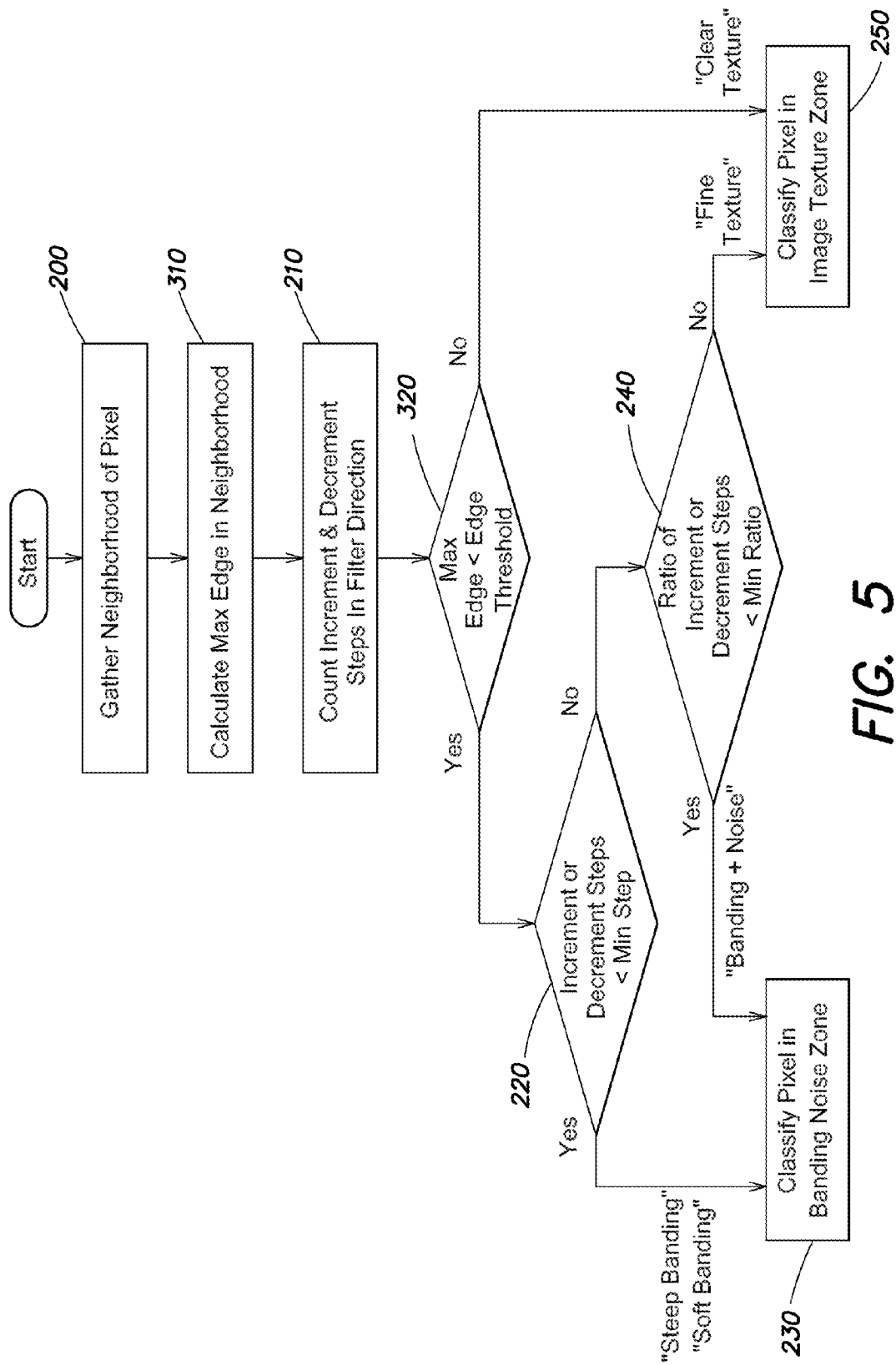
FIG. 5 is a flow chart of a process performed by the banding noise detector of FIG. 4, in accordance with further embodiments.

A flow chart of a process performed by the banding noise detector 100' of FIG. 4 in accordance with further embodiments is shown in FIG. 5. Like elements in FIGS. 3 and 5 have the same reference numerals.

In act 200, the pixels in the neighborhood of the current pixels are gathered as described above in connection with FIG. 3. In act 310, the maximum edge in the neighborhood of the current pixel is calculated.

The maximum edge in a neighborhood of a pixel can be calculated by applying any edge mask (such as Sobel, Prewitt, or Laplacian operator, just to name a few) on the input image and selecting the maximum gradient around the neighborhood N of the current pixel. An example of calculating the maximum edge in a neighborhood of a target pixel is given by Equations (7) to (9) below, where only horizontal transitions (vertical edges) are considered in the calculation of the maximum edge. These equations are very cost efficient for de-banding filtering in the horizontal direction. Another set of equations, Equations (10) to (13) below, describes another example of calculating the maximum edge in a neighborhood of a target pixel, where both horizontal and vertical transitions are considered for horizontal and/or vertical de-banding filtering.

$$W = \begin{array}{|c|c|c|} \hline -1 & 0 & 1 \\ \hline \end{array}$$

$$Grad(x, y) = \sum_{i=-1}^{1} W(i, j) \cdot I(x+i, y) \quad (7)$$

$$Edge(x, y) = |Grad_x(x, y)| \quad (8)$$

$$MaxEdge = \max_{(x,y) \in N} \{Edge(x, y)\} \quad (9)$$

$$W_x = \begin{array}{|c|c|c|} \hline -1 & 0 & 1 \\ \hline -1 & 0 & 1 \\ \hline \end{array} \quad W_y = \begin{array}{|c|c|c|} \hline -1 & -2 & -1 \\ \hline 1 & 2 & 1 \\ \hline \end{array}$$

$$Grad_x(x, y) = \sum_{i=-1}^{1} \sum_{j=-1}^{0} W_x(i, j) \cdot I(x+i, y+j) \quad (10)$$

$$Grad_y(x, y) = \sum_{i=-1}^{1} \sum_{j=-1}^{0} W_y(i, j) \cdot I(x+i, y+j) \quad (11)$$

$$Edge(x, y) = |Grad_x(x, y)| \times 2 + |Grad_y(x, y)| \quad (12)$$

$$MaxEdge = \max_{(x,y) \in N} \{Edge(x, y)\} \quad (13)$$

where $Grad_x(x,y)$ and $Grad_y(x,y)$ represent the gradients in the x and y directions, respectively, at coordinates (x,y) and $W_x$ and $W_y$ represent edge operators for detecting horizontal and vertical transitions, respectively.

In act 210, a count of increment steps and a count of decrement steps in the filter direction are determined as described above in connection with FIG. 3.

In act 320, the Max Edge calculated in act 310 is compared with an edge threshold. If the Max Edge is less than the edge threshold, as determined in act 320, the process proceeds to act 220. In act 220, a determination is made as to whether the count of increment steps or the count of decrement steps is less than the minimum step threshold, as described above in connection with FIG. 3. If the count of increment steps or the count of decrement steps is less than the minimum step threshold, as determined in act 220, the current pixel is classified as being in a banding noise zone in act 230. In this case, the current pixel is in a "steep banding" or "soft banding" zone.

If the count of increment steps or the count of decrement steps is not less than the minimum step threshold, as determined in act 220, the process proceeds to act 240. In act 240, the ratio described above in connection with FIG. 3 is compared with a minimum ratio threshold. If the ratio is less than the minimum ratio threshold, as determined in act 240, the pixel is classified as being in a banding noise zone in act 230. In this case, the current pixel is in a "banding+noise" zone.

If the ratio is not less than the minimum ratio threshold, as determined in act 240, the pixel is classified as being in an image texture zone in act 250. In this case, the current pixel is in a "fine texture" zone.

If the Max Edge is not less than the edge threshold, as determined in act 320, the pixel is classified as being in an image texture zone in act 250. In this case, the current pixel is in a "clear texture" zone.

Figure 6:
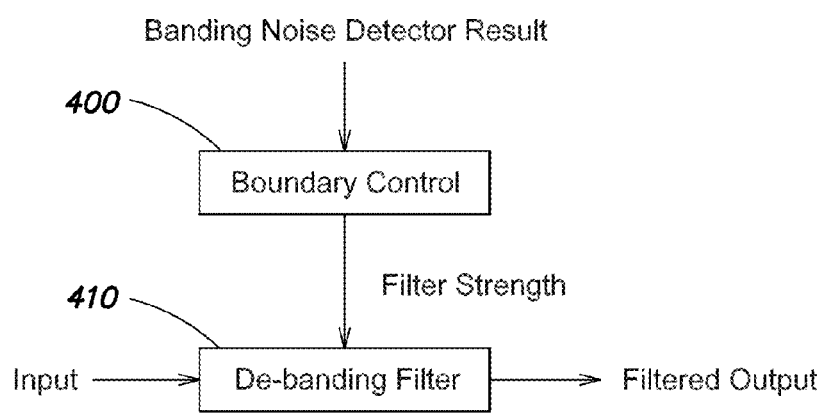
FIG. 6 is a flow chart of a process for performing boundary control and banding noise filtering, in accordance with embodiments.

A block diagram of a banding noise filter in accordance with embodiments is shown in FIG. 6. The banding noise filter of FIG. 6 may correspond to the vertical banding noise filter 110 or the horizontal banding noise filter 130 shown in FIG. 1. A boundary control block 400 receives a banding noise detector result from vertical banding noise detector 100 (FIG. 1) or horizontal banding noise detector 120 using the process of FIG. 3 or the process of FIG. 5. In some embodiments, the boundary control block 400 corresponds to the de-banding filter strength control unit 170 of FIGS. 2 and 4. The boundary control block 400 provides a filter strength to a debanding filter 410. The debanding filter 410 filters the digital image input signal according to the filter strength provided by boundary control block 400 and provides a filtered output.

The boundary control block 400 may adjust the filter strength in a boundary region between a banding noise zone and a non-banding noise zone, in order to avoid an abrupt transition in filter strength. Such an abrupt transition in filter strength may be noticeable in the filtered image. It will be understood that boundary control of filter strength is optional and may be omitted in some implementations. In general, boundary control of filter strength provides a gradual transition of filter strength across a boundary between a banding noise zone and a non-banding noise zone.

Figure 7:
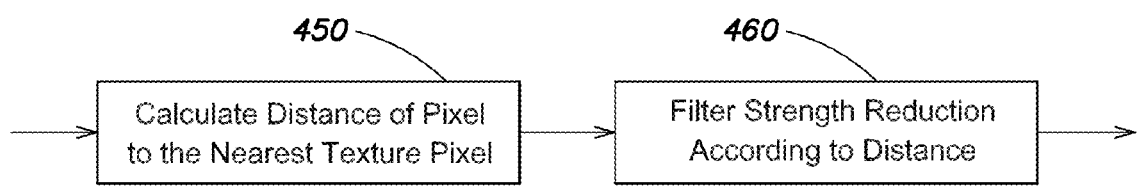
FIG. 7 is a flow chart of a process for performing boundary control, in accordance with embodiments.

A flow chart of a process for a boundary control of the filter strength is shown in FIG. 7. In act 450, a distance between the current pixel and the nearest texture pixel is calculated. In act 460, the filter strength is reduced from a maximum filter strength according to the calculated distance to the nearest texture pixel.

Figures 8, 9:
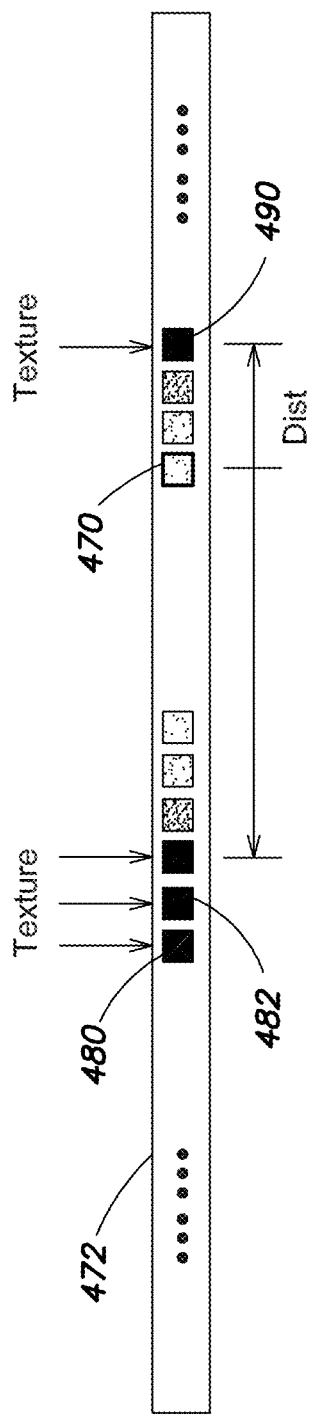
FIG. 8 is a schematic diagram that illustrates calculation of a distance between a current pixel and a nearest texture pixel.
FIG. 9 is a schematic diagram of a look-up table for selecting filter strength, in accordance with embodiments.

The calculation of the distance to the nearest texture pixel is illustrated in FIG. 8, where a current pixel 470 is located in a horizontal neighborhood 472. Texture pixels 480 and 482 are located to the left of current pixel 470 and a texture pixel 490 is located to the right of current pixel 470. Since texture pixel 490 is the nearest texture pixel to current pixel 470, the filter strength is reduced according to the distance between current pixel 470 and nearest texture pixel 490. The distance to the nearest texture pixel may be determined as follows:

$$\text{dist}(x,y) = \min\{d \,|\, [\text{TextureClass}(x+d,y) \cup \text{TextureClass}(x-d,y)] = 1\} \quad (14)$$

where dist(x,y) represents the distance to the nearest texture pixel, and TextureClass(x+d, y) represents the locations of the texture pixels.

In some embodiments, the filter strength is selected by use of a look-up table. An example of a look-up table 500 is shown in FIG. 9. The look-up table 500 provides a filter strength for each value of distance between the current pixel and the nearest texture pixel in a boundary region between a banding noise zone and a texture zone.

In the look-up table 500, values of filter strength for luna and chroma channels are given for each value of distance to the nearest texture pixel up to a maximum distance of 4 pixels in this example. Thus, pixels having a distance to the nearest texture pixel greater than 4 pixels are clipped to a distance of 4 pixels. Assuming the de-banding filter is an average filter as described in Equation (16) below, the filter strength at pixel (x,y) is controlled solely by the filter kernel radius with a maximum value $K_{max}$.

In some embodiments, the debanding filter 410 shown in FIG. 6 may be implemented as a (2K+1) tap finite impulse response (FIR) filter in a horizontal direction. The filter can be adapted for vertical filtering as well. A sigma filter which controls banding noise by a sigma threshold provides texture and detail protection. The sigma threshold may represent the assumed banding noise, i.e., it is assumed that the banding noise will not exceed the sigma threshold. As described above, the filter strength, in this case being controlled by the kernel radius K, can be controlled near a boundary between a banding noise zone and a texture zone. In the debanding filter, the current pixel value I(x,y) is controlled to provide a modified pixel value I'(x+i, y) as follows:

$$I'(x+i, y)_{i \in [-K,K]} = \begin{cases} I(x, y) + \sigma & \text{if } I(x+i, y) > I(x, y) + \sigma \\ I(x, y) - \sigma & \text{if } I(x+i, y) < I(x, y) - \sigma \\ I(x+i, y) & \text{otherwise} \end{cases} \quad (15)$$

The filter function $F_h(x,y)$ is given by:

$$F_h(x, y) = \frac{\sum_{i \in [-K,K]} I'(x+i, y)}{2K+1} \quad (16)$$

where, as noted above, K is the filter kernel radius.

Having thus described at least one illustrative embodiment of the invention, various alterations, modifications and improvements will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for detecting banding noise in a signal representative of an image, the method comprising:
   determining, by a banding noise detector, a count of increment steps in pixel values and a count of decrement steps in pixel values along a filter direction in a neighborhood of a current pixel of the image;
   checking, by the banding noise detector, if the count of increment steps or the count of decrement steps in the neighborhood of the current pixel exceeds a step threshold value;
   classifying, by the banding noise detector, the current pixel as being located in a banding noise zone if the count of increment steps or the count of decrement steps does not exceed the step threshold value;
   checking, by the banding noise detector, if a ratio of a minimum count of increment steps or decrement steps to a maximum count of increment steps or decrement steps exceeds a ratio threshold value; and
   classifying, by the banding noise detector, the current pixel as being located in the banding noise zone if the ratio does not exceed the ratio threshold value.

2. A method for detecting banding noise as defined in claim 1, further comprising classifying, by the banding noise detector, the current pixel as being located in an image texture zone if both the count of increment steps and the count of decrement steps exceeds the step threshold value, and if the ratio of the minimum count of increment steps or decrement steps to the maximum count of increment steps or decrement steps exceeds the ratio threshold value.

3. A method for detecting banding noise as defined in claim 1, further comprising:
   checking, by the banding noise detector, if a maximum edge value of the pixels in the neighborhood of the current pixel exceeds an edge threshold value;
   classifying, by the banding noise detector, the current pixel as being located in the banding noise zone if the maximum edge value does not exceed the edge threshold value, and if the count of increment steps or the count of decrement steps does not exceed the step threshold value; and
   classifying, by the banding noise detector, the current pixel as being located in the banding noise zone if the maximum edge value does not exceed the edge threshold value, and if the ratio of the minimum count of increment steps or decrement steps to the maximum count of increment steps or decrement steps does not exceed the ratio threshold value.

4. A method for detecting banding noise as defined in claim 3, further comprising classifying, by the banding noise detector, the current pixel as being located in an image texture zone if the maximum edge value of the pixels in the neighborhood of the current pixel exceeds the edge threshold value.

5. A method for detecting banding noise as defined in claim 1, further comprising controlling a filter strength of a banding noise filter near a boundary between the banding noise zone and a texture zone to produce a desired transition of filter strength between the banding noise zone and the texture zone.

6. A method for detecting banding noise as defined in claim 1, further comprising controlling a filter strength of a banding noise filter near a boundary between the banding noise zone and a texture zone based on a distance between the current pixel and a nearest pixel in the texture zone.

7. A method for detecting banding noise as defined in claim 6, wherein controlling the filter strength comprises controlling a kernel radius of the banding noise filter.

8. A method for detecting banding noise as defined in claim 1, further comprising performing the determining, the checking and the classifying in vertical and/or horizontal directions of the image.

9. A method for detecting banding noise as defined in claim 1, wherein the count of increment steps and the count of decrement steps is determined as follows:

$$Cp = \sum_{(x,y)\in N} [(I(x, y) > I(x - 1, y))?1:0]$$

$$Cn = \sum_{(x,y)\in N} [(I(x, y) < I(x - 1, y))?1:0]$$

where Cp represents the count of increment steps in the filter direction, Cn represents the count of decrement steps in the filter direction, and I(x,y) represents the pixel value at coordinates (x,y) in the image.

10. A method for detecting banding noise as defined in claim 1, wherein the count of increment steps and the count of decrement steps is determined as follows:

$$Cp = \sum_{j\in[-(H-1),0]} \left[\left(\sum_{i\in[0,W-1]} \left[\left(I\left(\left\lfloor\frac{x}{W}\right\rfloor\times W + i, y + j\right) > I\left(\left\lfloor\frac{x}{W}\right\rfloor\times W + i, y + j - 1\right)\right)?1:0\right]\right) > 0?1:0\right]$$

$$Cn = \sum_{j\in[-(H-1),0]} \left[\left(\sum_{i\in[0,W-1]} \left[\left(I\left(\left\lfloor\frac{x}{W}\right\rfloor\times W + i, y + j\right) < I\left(\left\lfloor\frac{x}{W}\right\rfloor\times W + i, y + j - 1\right)\right)?1:0\right]\right) > 0?1:0\right]$$

where Cp represents the count of increment steps in the filter direction, Cn represents the count of decrement steps in the filter direction, I represents the pixel value, W represents the width of the neighborhood in pixels, and H represents the height of the neighborhood in pixels.

11. An apparatus for detecting banding noise in a signal representative of an image, the apparatus comprising:
   an increment and decrement steps counter configured to determine a count of increment steps in pixel values and a count of decrement steps in pixel values along a filter direction in a neighborhood of a current pixel of the image; and
   a banding noise/texture pixel classifier configured to
      check if the count of increment steps or the count of decrement steps in the neighborhood of the current pixel exceeds a step threshold value and to classify the current pixel as being located in a banding noise zone if the count of increment steps or the count of decrement steps does not exceed the step threshold value, and
      check if a ratio of a minimum count of increment steps or decrement steps to a maximum count of increment steps or decrement steps exceeds a ratio threshold value and to classify the current pixel as being located in the banding noise zone if the ratio does not exceed the ratio threshold value.

12. An apparatus for detecting banding noise as defined in claim 11, wherein the banding noise/texture pixel classifier is configured to classify the current pixel as being located in an image texture zone if both the count of increment steps and the count of decrement steps exceeds the step threshold value, and if the ratio of the minimum count of increment steps or decrement steps to the maximum count of increment steps or decrement steps exceeds the ratio threshold value.

13. An apparatus for detecting banding noise as defined in claim 11, further comprising a max edge computation unit configured to determine a maximum edge value of the pixels in the neighborhood of the current pixel; wherein the banding noise/texture pixel classifier is configured to
   classify the current pixel as being in the banding noise zone if the maximum edge value does not exceed an edge threshold value, and if the count of increment steps or the count of decrement steps does not exceed the step threshold value, and
   classify the current pixel as being located in the banding noise zone if the maximum edge value does not exceed the edge threshold value, and if the ratio of a minimum count of increment steps or decrement steps to the maximum count of increment steps or decrement steps does not exceed the ratio threshold value.

14. An apparatus for detecting banding noise as defined in claim 13, wherein the banding noise/texture pixel classifier is further configured to classify the current pixel as being located in an image texture zone if the maximum edge value of the pixels in the neighborhood of the current pixel exceeds the edge threshold value.

15. An apparatus for detecting banding noise as defined in claim 11, further comprising a de-banding filter strength control unit configured to control a filter strength of a banding noise filter near a boundary between the banding noise zone and a texture zone to produce a desired transition of filter strength between the banding noise zone and the texture zone.

16. An apparatus for detecting banding noise as defined in claim 11, further comprising a de-banding filter strength control unit configured to control a filter strength of a banding noise filter near a boundary between the banding noise zone and a texture zone based on a distance between the current pixel and a nearest pixel in the texture zone.

17. An apparatus for detecting banding noise as defined in claim 16, wherein the de-banding filter strength control unit is configured to control a kernel radius of the banding noise filter.

18. An apparatus for detecting banding noise as defined in claim 11, wherein the count of increment steps and the count of decrement steps is determined by the increment and decrement steps counter as follows:

$$Cp = \sum_{(x,y)\in N} [(I(x, y) > I(x-1, y))?1:0]$$

$$Cn = \sum_{(x,y)\in N} [(I(x, y) < I(x-1, y))?1:0]$$

where Cp represents the count of increment steps in the filter direction, Cn represents the count of decrement steps in the filter direction, and I(x,y) represents the pixel value at coordinates (x,y) in the image.

19. An apparatus for detecting banding noise as defined in claim 11, wherein the count of increment steps and the count of decrement steps is determined by the increment and decrement steps counter as follows:

$$Cp = \sum_{j\in[-(H-1),0]} \left[\left(\sum_{i\in[0,W-1]} \left[\left(I\left(\left\lfloor\frac{x}{W}\right\rfloor\times W + i, y + j\right) > I\left(\left\lfloor\frac{x}{W}\right\rfloor\times W + i, y + j - 1\right)\right)?1:0\right]\right) > 0?1:0\right]$$

$$Cn = \sum_{j\in[-(H-1),0]} \left[\left(\sum_{i\in[0,W-1]} \left[\left(I\left(\left\lfloor\frac{x}{W}\right\rfloor\times W + i, y + j\right) < I\left(\left\lfloor\frac{x}{W}\right\rfloor\times W + i, y + j - 1\right)\right)?1:0\right]\right) > 0?1:0\right]$$

where Cp represents the count of increment steps in the filter direction, Cn represents the count of decrement steps in the filter direction, I represents the pixel value, W represents the width of the neighborhood in pixels and H represents the height of the neighborhood in pixels.

20. An apparatus for filtering banding noise in a signal representative of an image, comprising:
   a banding noise detector including:
      an increment and decrement steps counter configured to determine a count of increment steps in pixel values and a count of decrement steps in pixel values along filter direction in a neighborhood of a current pixel of the image,
   a banding noise/texture pixel classifier configured to
      check if the count of increment steps or the count of decrement steps in the neighborhood of the current pixel exceeds a step threshold value and to classify the current pixel as being located in a banding noise zone if the count of increment steps or the count of decrement steps does not exceed the step threshold value, and
      check if a ratio of a minimum count of increment steps or decrement steps to a maximum count of increment steps or decrement steps exceeds a ratio threshold value and to classify the current pixel as being located in the banding noise zone if the ratio does not exceed the ratio threshold value, and
   a de-banding filter strength control unit configured to control filter strength based on a result of classifying the current pixel; and
   a banding noise filter configured to filter the current pixel in accordance with the filter strength determined by the de-banding filter strength control unit.

21. An apparatus for filtering banding noise as defined in claim 20, wherein the banding noise/texture pixel classifier is configured to classify the current pixel as being located in an image texture zone if both the count of increment steps and the count of decrement steps exceeds the step threshold value, and if the ratio of the minimum count of increment steps or decrement steps to the maximum count of increment steps or decrement steps exceeds the ratio threshold value.

22. An apparatus for filtering banding noise as defined in claim 20, wherein the banding noise detector further comprises a max edge computation unit configured to determine a maximum edge value of the pixels in the neighborhood of the current pixel; wherein the banding noise/texture pixel classifier is configured to
   classify the current pixel as being in the banding noise zone if the maximum edge value does not exceed an edge threshold value, and if the count of increment steps or the count of decrement steps does not exceed the step threshold value, and
   classify the current pixel as being located in the banding noise zone if the maximum edge value does not exceed the edge threshold value, and if the ratio of a minimum count of increment steps or decrement steps to the maximum count of increment steps or decrement steps does not exceed the ratio threshold value.

23. An apparatus for filter banding noise as defined in claim 20, wherein the banding noise detector further comprises a de-banding filter strength control unit configured to control a filter strength of a banding noise filter near a boundary between the banding noise zone and a texture zone based on a distance between the current pixel and a nearest pixel in the texture zone.

24. A method for filtering banding noise in a signal representative of an image, the method comprising:
   determining, by an increment and decrement steps counter, a count of increment steps in pixel values and a count of decrement steps in pixel values along a filter direction in a neighborhood of a current pixel of the image;
   classifying, by a banding noise/texture pixel classifier, the current pixel as being located in a banding noise zone if the count of increment steps or the count of decrement steps does not exceed a step threshold value;
   checking, by the banding noise/texture detector, if a ratio of a minimum count of increment steps or decrement steps to a maximum count of increment steps or decrement steps exceeds a ratio threshold value;
   classifying, by the banding noise/texture detector, the current pixel as being located in the banding noise zone if the ratio does not exceed the ratio threshold value;
   controlling, by a de-banding filter strength control unit, filter strength based on a result of classifying the current pixel; and
   filtering, by a banding noise filter, the current pixel based on the controlled filter strength.

25. A non-transitory computer-readable storage device encoded with computer-executable instructions that, when executed by a processing device, perform a method for detecting banding noise in a signal representative of an image, the method comprising:
   determining, by a banding noise detector, a count of increment steps in pixel values and a count of decrement steps in pixel values along a filter direction in a neighborhood of a current pixel of the image;
   checking, by the banding noise detector, if the count of increment steps or the count of decrement steps in the neighborhood of the current pixel exceeds a step threshold value;
   classifying, by the banding noise detector, the current pixel as being located in a banding noise zone if the count of increment steps or the count of decrement steps does not exceed the step threshold value;

checking, by the banding noise detector, if a ratio of a minimum count of increment steps or decrement steps to a maximum count of increment steps or decrement steps exceeds a ratio threshold value; and classifying, by the banding noise detector, the current pixel as being located in the banding noise zone if the ratio does not exceed the ratio threshold value.

26. The non-transitory computer-readable storage device as defined in claim 25, wherein the method further comprises classifying, by the banding noise detector, the current pixel as being located in an image texture zone if both the count of increment steps and the count of decrement steps exceeds the step threshold value, and if the ratio of the minimum count of increment steps or decrement steps to the maximum count of increment steps or decrement steps exceeds the ratio threshold value.

27. The non-transitory computer-readable storage device as defined in claim 25, wherein the method further comprises:

checking, by the banding noise detector, if a maximum edge value of the pixels in the neighborhood of the current pixel exceeds an edge threshold value;

classifying, by the banding noise detector, the current pixel as being located in the banding noise zone if the maximum edge value does not exceed the edge threshold value, and if the count of increment steps or the count of decrement steps does not exceed the step threshold value; and classifying, by the banding noise detector, the current pixel as being located in the banding noise zone if the maximum edge value does not exceed the edge threshold value, and if the ratio of the minimum count of increment steps or decrement steps to the maximum count of increment steps or decrement steps does not exceed the ratio threshold value.

28. A method for detecting banding noise in a signal representative of an image, the method comprising:

determining, by a banding noise detector, a count of increment steps in pixel values and a count of decrement steps in pixel values along a filter direction in a neighborhood of a current pixel of the image;

checking, by the banding noise detector, if the count of increment steps or the count of decrement steps in the neighborhood of the current pixel exceeds a step threshold value; and classifying, by the banding noise detector, the current pixel as being located in a banding noise zone if the count of increment steps or the count of decrement steps does not exceed the step threshold value;

wherein the count of increment steps and the count of decrement steps is determined as follows:

$$Cp = \sum_{(x,y) \in N} [(I(x, y) > I(x-1, y))?1:0]$$

$$Cn = \sum_{(x,y) \in N} [(I(x, y) < I(x-1, y))?1:0]$$

where Cp represents the count of increment steps in the filter direction, Cn represents the count of decrement steps in the filter direction, and I(x,y) represents the pixel value at coordinates (x,y) in the image.

29. A method for detecting banding noise as defined in claim 28, further comprising controlling a filter strength of a banding noise filter near a boundary between the banding noise zone and a texture zone to produce a desired transition of filter strength between the banding noise zone and the texture zone.

30. A method for detecting banding noise as defined in claim 28, further comprising controlling a filter strength of a banding noise filter near a boundary between the banding noise zone and a texture zone based on a distance between the current pixel and a nearest pixel in the texture zone.

31. An apparatus for detecting banding noise in a signal representative of an image, the apparatus comprising:

an increment and decrement steps counter configured to determine a count of increment steps in pixel values and a count of decrement steps in pixel values along a filter direction in a neighborhood of a current pixel of the image; and a banding noise/texture pixel classifier configured to check if the count of increment steps or the count of decrement steps in the neighborhood of the current pixel exceeds a step threshold value and to classify the current pixel as being located in a banding noise zone if the count of increment steps or the count of decrement steps does not exceed the step threshold value;

wherein the count of increment steps and the count of decrement steps is determined by the increment and decrement steps counter as follows:

$$Cp = \sum_{(x,y) \in N} [(I(x, y) > I(x-1, y))?1:0]$$

$$Cn = \sum_{(x,y) \in N} [(I(x, y) < I(x-1, y))?1:0]$$

where Cp represents the count of increment steps in the filter direction, Cn represents the count of decrement steps in the filter direction, and I(x,y) represents the pixel value at coordinates (x,y) in the image.

32. An apparatus for detecting banding noise as defined in claim 31, further comprising a de-banding filter strength control unit configured to control a filter strength of a banding noise filter near a boundary between the banding noise zone and a texture zone to produce a desired transition of filter strength between the banding noise zone and the texture zone.

33. An apparatus for detecting banding noise as defined in claim 31, further comprising a de-banding filter strength control unit configured to control a filter strength of a banding noise filter near a boundary between the banding noise zone and a texture zone based on a distance between the current pixel and a nearest pixel in the texture zone.

* * * * *